T. C. ADAMS AND A. M. ROACH.
CHIME CLOCK.
APPLICATION FILED MAY 15, 1916.

1,322,216.

Patented Nov. 18, 1919.
5 SHEETS—SHEET 1.

INVENTORS
THOMAS C. ADAMS
ARTHUR M. ROACH
ATTORNEYS

T. C. ADAMS AND A. M. ROACH.
CHIME CLOCK.
APPLICATION FILED MAY 15, 1916.

1,322,216.

Patented Nov. 18, 1919.
5 SHEETS—SHEET 2.

WITNESSES

INVENTORS
THOMAS C. ADAMS
ARTHUR M. ROACH
BY

ATTORNEYS

T. C. ADAMS AND A. M. ROACH.
CHIME CLOCK.
APPLICATION FILED MAY 15, 1916.
1,322,216.
Patented Nov. 18, 1919.
5 SHEETS—SHEET 3.
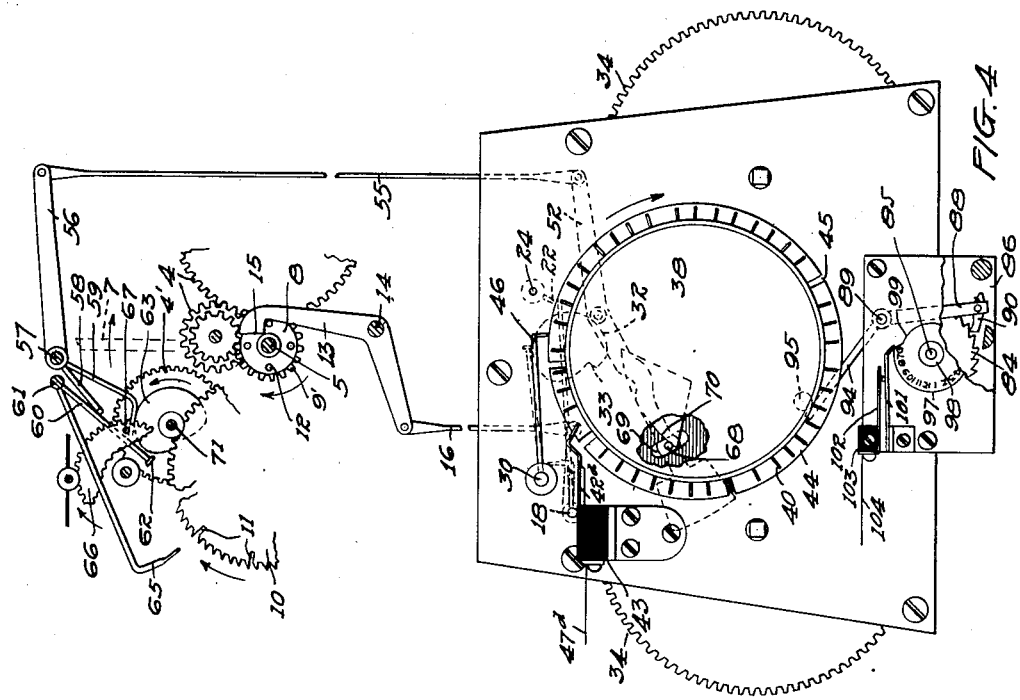
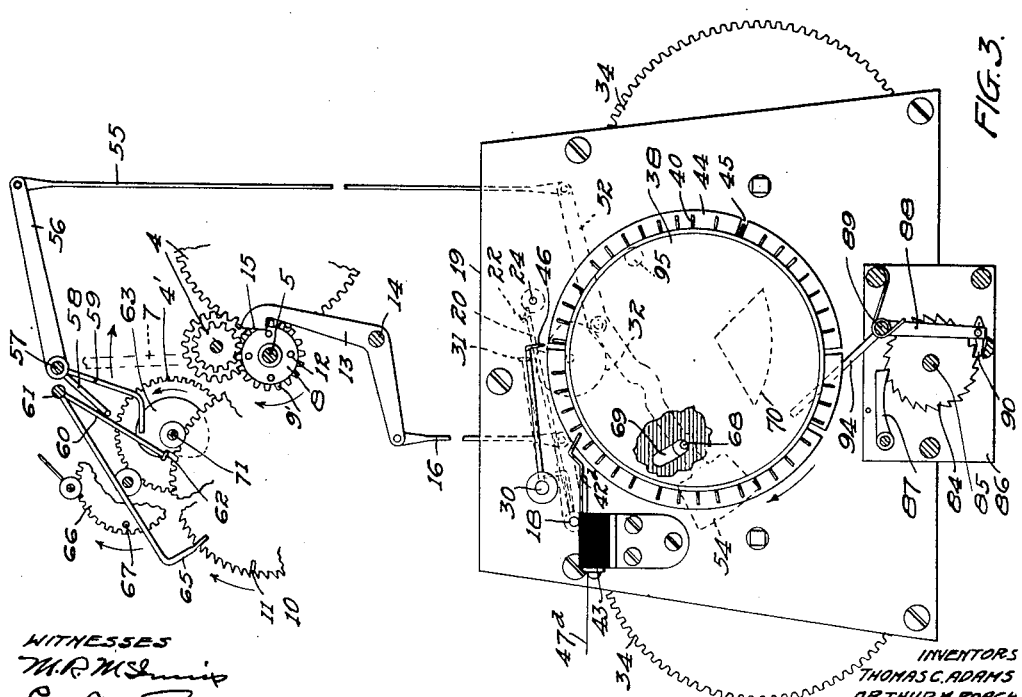
WITNESSES
M. R. McInnis
E. A. Paul
INVENTORS
THOMAS C. ADAMS
ARTHUR M. ROACH
BY
Paul Paul
ATTORNEYS

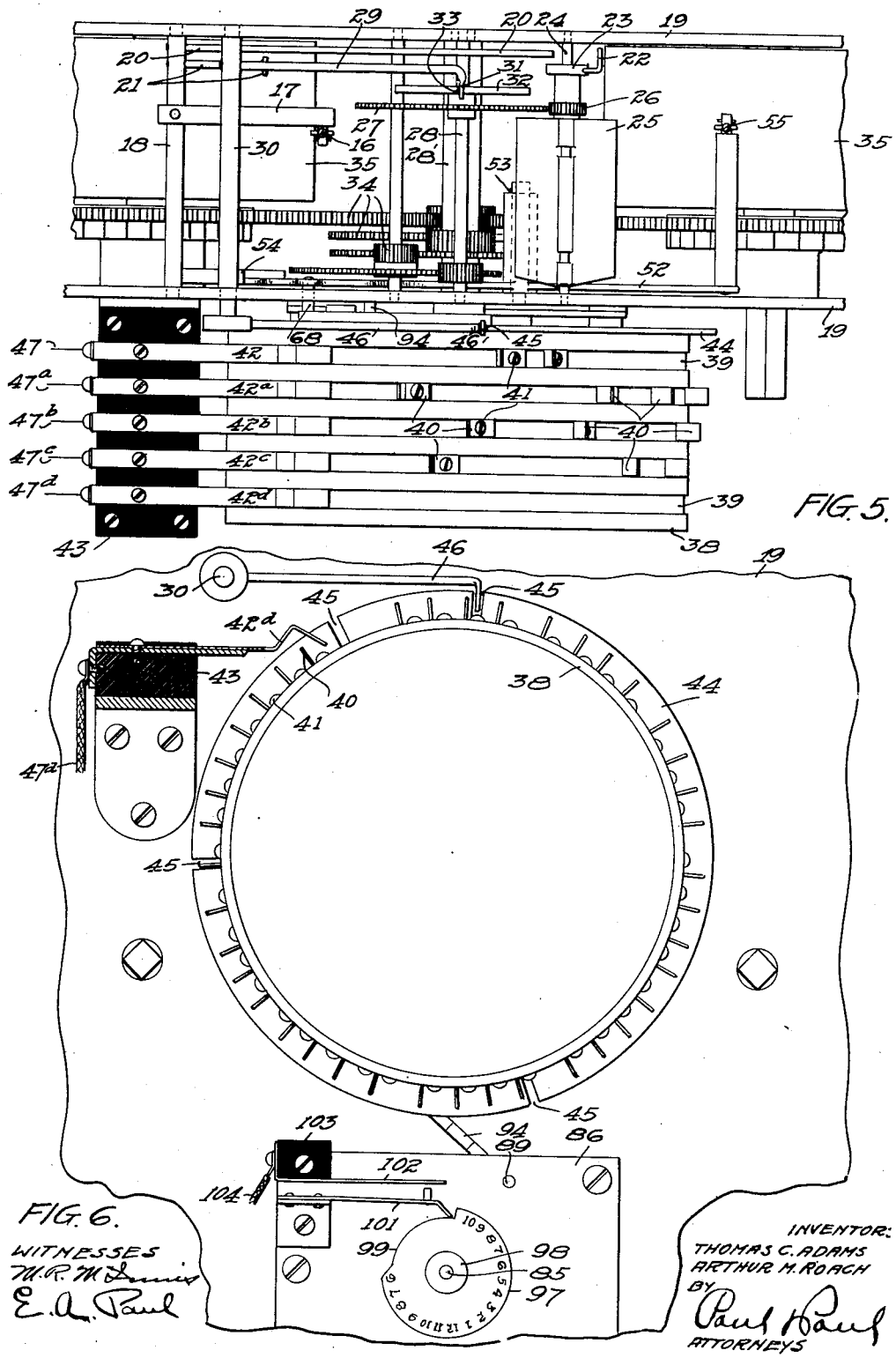

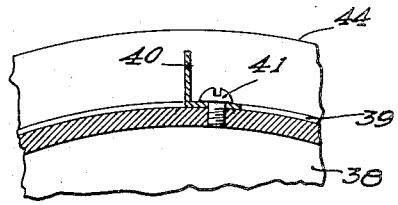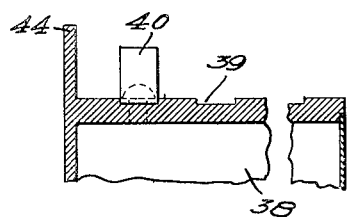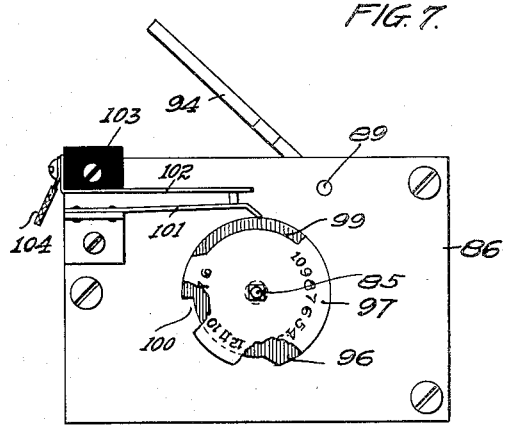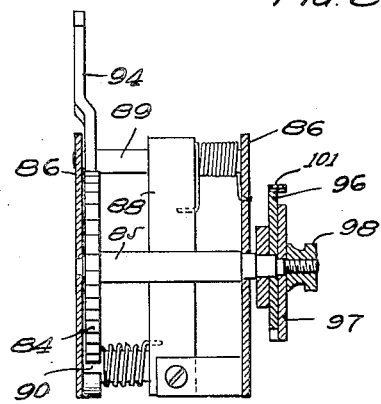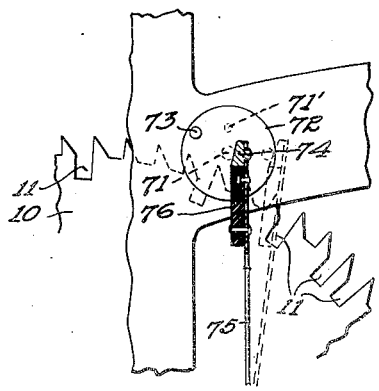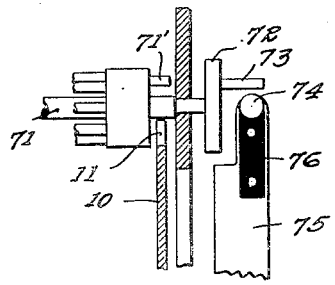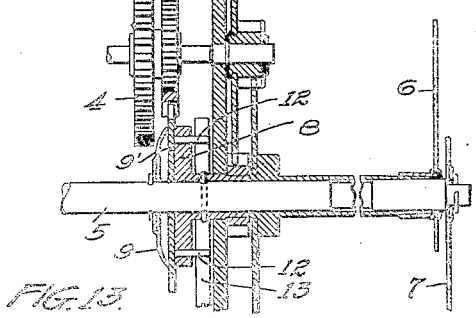

UNITED STATES PATENT OFFICE.

THOMAS C. ADAMS AND ARTHUR M. ROACH, OF MINNEAPOLIS, MINNESOTA, ASSIGNORS TO McCLINTOCK-LOOMIS COMPANY, OF MINNEAPOLIS, MINNESOTA, A CORPORATION OF MINNESOTA.

CHIME-CLOCK.

1,322,216.   Specification of Letters Patent.   Patented Nov. 18, 1919.

Application filed May 15, 1916. Serial No. 97,663.

*To all whom it may concern:*

Be it known that we, THOMAS C. ADAMS and ARTHUR M. ROACH, citizens of the United States, residents of Minneapolis, county of Hennepin, State of Minnesota, have invented certain new and useful Improvements in Chime-Clocks, of which the following is a specification.

The object of our invention is to provide a chime attachment for a clock operable at the end of the four quarters of the hour and and in connection with the striking mechanism of the clock, the device being used not only as a time piece but as an advertising medium for banks, stores and other places of business.

A further object is to provide a chime clock mechanism in which the commutator device employed for regulating the closing of the different chime circuits while controlled by the timing mechanism is operated independently thereof.

A further object is to provide a chime mechanism having means for rendering it operative or inoperative, as desired, and for determining the period during which the chimes may be rung.

Other objects of the invention will appear from the following detailed description.

The invention consists generally in various constructions and combinations, all as hereinafter described and particularly pointed out in the claims.

In the accompanying drawings forming part of this specification,

Fig. 3 is a detail sectional view, showing the strike controlling mechanism of the time piece and its connection with the chime attachment, the strike controlling mechanism being shown in its locked position, Fig. 4 is a similar view, showing the strike controlling mechanism in its released position, Fig. 5 is a plan view of the chime mechanism and commutator, Fig. 6 is an end view of the commutator, showing the means for locking it and also illustrating the mounting of the contact brushes, Figs. 7 and 8 are detail views of the preferred manner of mounting the contact plates in the commutator, Figs. 9 and 10 are detail views of the dial devices for regulating the length of the periods during which the chimes may operate, Figs. 11 and 12 are detail views of the mechanism employed for closing the circuit to operate the hour striking device, Fig. 13 is a detail sectional view, showing the manner of mounting the hour and minute hands when driving the same.

Figure 1:
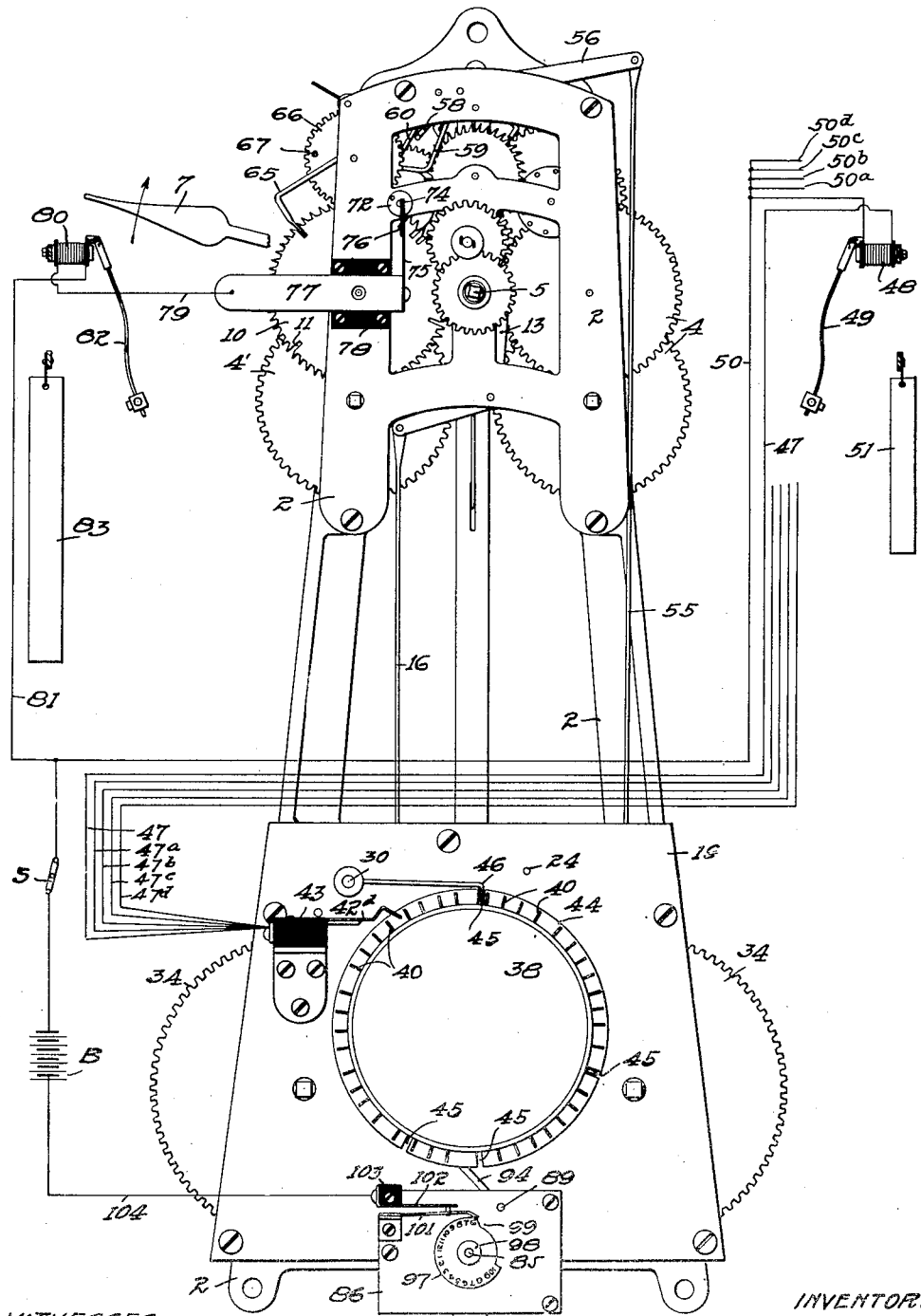
Figure 1 is a front elevation of a chime clock embodying our invention.
Figure 2:
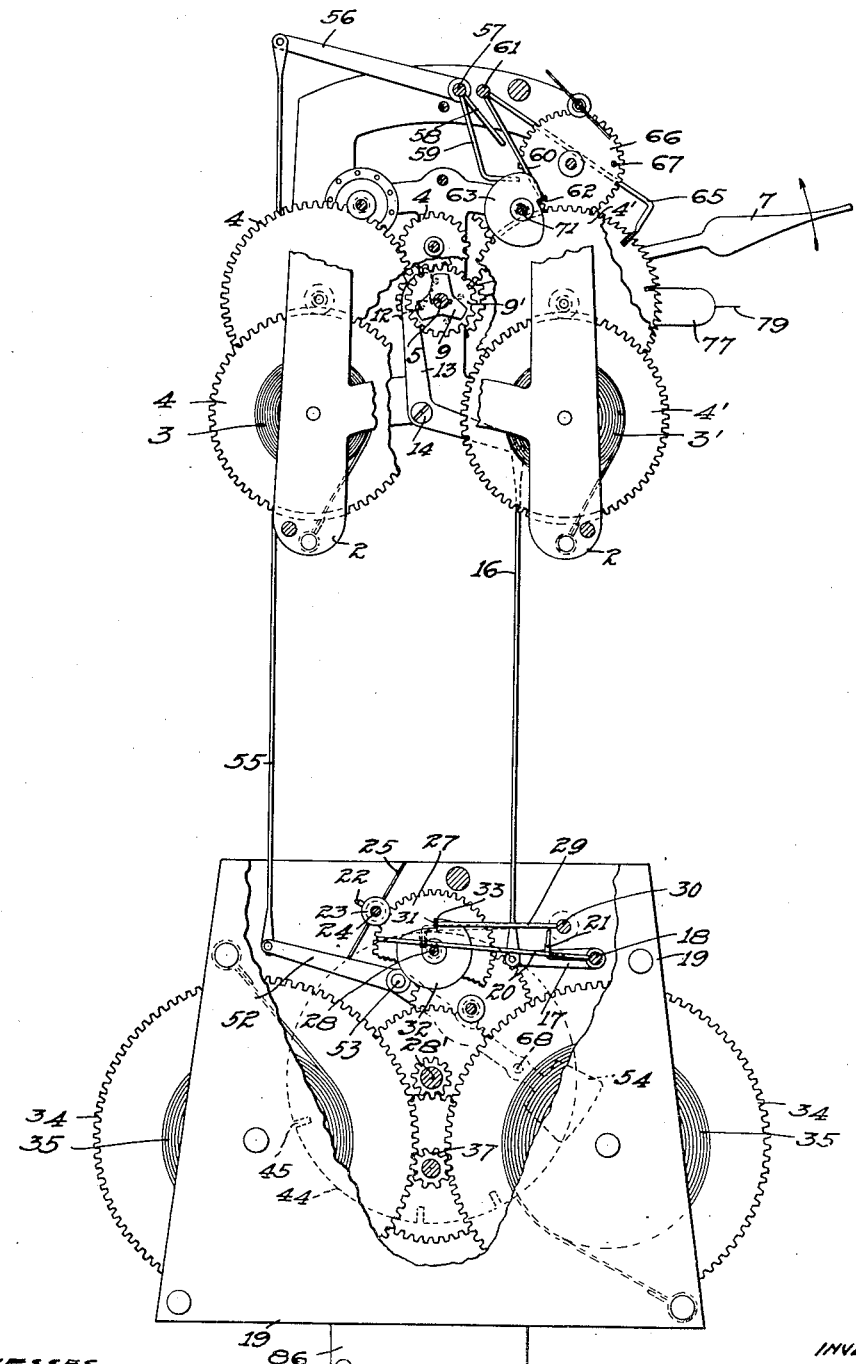
Fig. 2 is a rear view of the same, with a portion of the frame broken away.

In the drawing, referring to Figs. 1 and 2, 2 represents the frame of the time piece having a spring 3 and a train of gears 4 for operating the post 5 on which the hour hand 6 and the minute hand 7 are mounted. The post 5 is provided with a disk 8 between which and a spring washer 9 is a loosely mounted gear 9' driven by the train of gears 4. The disk has the usual reduction gears for the hour hand 6 (see Fig. 13). A similar spring 3' and a train of gears 4' are provided for operating a ratchet wheel 10 having slots 11 therein spaced apart to indicate the hour periods, there being twelve of them provided in this wheel. The disk 8 has pins 12 therein spaced equally from one another and indicating the quarter hour periods, there being four of the pins in the circumference of the disk.

A bell crank 13 is pivoted at 14 in the frame and has a face 15 in the path of the pins 12. This bell crank is connected by a link 16 (see Figs. 1, 2, 3 and 4) with an arm 17 on a shaft 18 that is mounted in plates 19 at the lower end of the frame 2. In the shaft 18 a long arm 20 and a comparatively short arm 21 are mounted. The former projects into the path of a finger 22 carried by the hub 23 on a shaft 24 provided with a fan 25 and a pinion 26 meshing with a gear 27 on a shaft 28. The shorter arm 21 is positioned to contact with a rod 29 mounted in a rock shaft 30 and having an end 31 at right angles to the main portion of the arm. A cam 32 having a shoulder 33 normally engages the end 31 and thereby the cam and the shaft 28 on which said cam is mounted are locked against premature movement. The shaft 28 is driven through a train of gears 34 from springs 35 mounted upon opposite sides of a transmission pinion 37. These springs are independent of the clock springs and have for their function the operation of the commutator or drum through which the circuits are closed to the magnets of the chimes.

38 represents the commutator, mounted on a shaft 28' and driven by the train of gears 34 and having a series of annular grooves 39 in its periphery in which angle plates 40 are secured, said plates being adjustable in said grooves by means of the screws 41 and having projecting end portions in position to contact with brushes 42, 42$^a$, 42$^b$, 42$^c$ and 42$^d$, representing the different brushes of the chime circuits, there being five in number shown herein though, of course, this number may be increased or decreased according to the nature of the chime.

A block 43 of insulating material is mounted adjacent to the commutator 38 and on this block the brushes are mounted, as shown in Fig. 5. The commutator has an annular flange 44 at one end provided with notches 45 therein in position to receive a hook 46 that is mounted on the shaft 30. When the shaft 30 is rocked by the movement of the arm 21, the rod 29 and the hook 46 are raised, the end 31 releasing the cam 32 and allowing it to move and through the gear 27 and pinion 26 to bring the short arm 22 against the long arm 20 and thus stop further movement of the cam (see Fig. 3). Instantly upon the release of the arm 13 from the pin 12 the rods 20 and 29 will drop and the former will release the short arm 22 and allow the cam to revolve while the latter will drop only as far as the hook 46 will permit. Said hook, riding on the flange 44, will keep the hook 31 from engaging the shoulder 33 of the cam 32, permitting the commutator to revolve until the hook reaches a point opposite the next slot in the flange. As the commutator turns, the hook will drop into this slot and further movement will be checked as the hook 31 engages the shoulder 33 of the cam 32. In the meantime, the brushes have been riding on the contact plates mounted in the surface of the commutator and when any one of the brushes 42, 42$^a$, 42$^b$, 42$^c$ and 42$^d$ engage the plates of the first group of the commutator the circuit will be closed through the conductors 47, 47$^a$, 47$^b$, 47$^c$ and 47$^d$ to the electromagnets 48 controlling the hammers 49 and the conductors 50, 50$^a$, 50$^b$, 50$^c$, or 50$^d$ through the switch S and battery B to the frame of the timer. The armatures of the hammers 49 will thereby be attracted to cause the hammers to strike the chime 51. We have shown but one complete set of armature hammer and chime, but it will be understood that corresponding sets are provided for each of the other brush connections.

As the commutator revolves, the other circuits will be successively closed through conductors 47$^a$, 47$^b$, 47$^c$ and 47$^d$ at the end of the remaining fifteen minute periods; that is, at the half, three quarter, and hour movements of the time piece and the remaining notes of the chime will be sounded at the completion of these periods.

Mounted in the plates 19 is a lever 52 pivoted at 53 and having a weight 54 at one end and connected at its opposite end by a link 55 with an arm 56 on a rock shaft 57. This shaft 57 carries fingers 58 and 59, the former being positioned to contact with an arm 60 on a shaft 61 which has an end 62 positioned to engage a shoulder on a cam 63 and lock the train of gears 4'. A hook 65 is mounted on the shaft 61 and positioned to engage slots 11 in the gear 10, and a gear 66 is driven from the train 4' and has a pin 67 positioned to engage the finger 59 and lock the gear 66 when the finger 58 is rocked to trip the arm 60 and the hook 65. The lever 52 has a pin 68 thereon projecting into a slot 69 in the plate 19 in position to contact with a cam surface 70 on the head of the commutator, said cam surface being positioned to engage this pin and rock the lever 52 and release the cam 63 at a predetermined point in the revolution of the commutator. This will generally be at the end of the hour period. The cam, when released, will advance sufficiently to allow the pin 67 on the gear 66 to come in contact with the arm 59 (see Fig. 4) and be locked from further movement. When the pin 68 drops off the cam 70 the weighted arm 52 will drop back to its former position and thereby release the pin 67 and allow the train of gears 4' to move the hook 62. The arm 60, riding on the surface of the cam 63, normally prevents the hook 65 from dropping into the slot 11 in the ratchet wheel 10. The movement of the train 4' will revolve the cam shaft 71 and the disk 72 provided with a pin 73 and said pin will contact with a conductor 74 mounted on an arm 75 that is provided with an insulating surface 76 on which the pin 73 travels before contacting with the conducting surface 74 (see Figs 11 and 12). The spring arm 75 is mounted on a plate 77 insulated at 78 from the frame 2 and connected by a conductor 79 with an electromagnet 80 which is in circuit with the battery B and the frame of the chime by conductor 81 and is provided with a striking hammer 82 for the gong 83.

The cam shaft 71 has a pin 71' that engages the teeth on the loosely mounted ratchet wheel 10 and for each revolution of said cam shaft the ratchet wheel is advanced one tooth. The end 62 of the arm 60 is kept out of engagement with the shoulder of the cam by the hook 65 resting on top and between the teeth of the ratchet. When the required number of teeth have been moved, the hook 65 will again drop into one of the deep notches 11 and thereby allow the end 62 to come into engagement with the cam 63 and lock the same.

It is desirable in a device of this kind to provide a mechanism by means of which the chimes may be rendered operative or inoperative for a predetermined period and with this end in view we provide a ratchet wheel 84 on a spindle 85 that is carried by a frame 86 secured to the plates 19 in the lower portion of the frame. This ratchet wheel has a dog 87 (Fig. 3). A bar 88 is mounted on a shaft 89 from which an arm 94 projects into the path of a pin 95 on the head of the commutator so that once with every complete revolution of the commutator the arm 94 will be oscillated to rock the shaft 89 and through the dog 90 cause the ratchet 84 to be revolved. This revolution of the ratchet will revolve the cam dials 96 and 97 which are secured on the spindle 85 by means of a thumb nut 98. These cams have recesses 99 and 100 in their peripheries and a brush 101 is mounted to ride on the peripheries of these cams and close the circuit through contact spring 102 which is carried by an insulating block 103 and has a conductor 104 leading to the battery B and through it to the switch S and the hour and chime circuits.

The end of the spindle 85 is squared to receive the outer dial 97, while the dial 96 fits on to a circular portion of the spindle 85 and is free to turn thereon when the lock nut 98 is released. This is done when it is desired to change the period of operation of the chimes, the dial 97 having figures thereon representing the hours and, as shown, a blank space is provided representing the time between ten o'clock at night and six in the morning, and generally the dial 96 will be adjusted to register its recess with the one in the dial 97, as indicated in Fig. 6, so that the brush 101 riding on the edges of the cams, will drop into the recess soon after ten o'clock and break the circuit between the brush and the contact spring 102 and thereby the chimes will be cut out until the brush rides up on the edge of the dials again at the other end of the recess, which may be at six o'clock in the morning or any other preferred time. In this way we are able to regulate the period of operation of the chimes and the interval of non-operation.

The operation of the clock is as follows: A short time prior to the termination of a fifteen minute period one of the pins 12 will engage and actuate the bell crank 13 to raise the arms 20 and 29 and release the spring-actuated mechanism which operates the revolving commutator. At the same time the hook or dog 46 will be lifted out of its notch in the periphery of the commutator. When the cam 32 is released, the shoulder thereon will clear the end 31 and when this separation or clearance has taken place, the arm 20, moving into the path of the finger 22, will check the movement of the train of gears through which the commutator is operated, and the commutator will remain at rest until the pin 12 is moved past the surface 15 when the bell crank 13 will return to the position indicated in Fig. 4. The arm 20 may then drop down out of the path of the finger 22 but the hooks or dogs, riding on the cam 32 and the periphery of the drum, cannot return to their normal position until the cam has completed its revolution. The travel of this cam will be timed, of course, with that of the gear 8 so that the end 31 will engage the shoulder 33 and stop the train of gears at the same time the peripheral notch in the commutator is opposite the dog 46 to receive it when the dog 29 drops into its locking position against the shoulder 33 of the cam 32. This will be at the end of the chime period during which the circuits have been closed through the commutator brushes to ring a certain predetermined number of chimes. This operation will be repeated at fifteen minute intervals throughout the hour. At the end of the hour period the cam face 70 on the commutator will contact with the pin 68 and will operate the weighted lever for releasing the striking attachment of the master clock, and thereupon the clock will strike the hour in the ordinary way.

We claim as our invention:

1. The combination, with a time piece having hour and minute hands, of a revolving commutator having contacting surfaces and brushes therefor, electric circuits for said brushes, a chime mechanism connected with said circuits, means for normally locking said commutator, means mechanically connecting the locking means of the commutator with the time-piece and operatively positioned in relation to a part of the time-piece for periodically releasing the commutator to close the circuit between the commutator and chime mechanism.

2. The combination, with a time piece having hour and minute hands, of a commutator having contacting surfaces and brushes therefor, electric circuits for said brushes, a chime mechanism in said electric circuits, a notched cam and dog therefor for normally locking said commutator against premature movement, and means operatively connected with said time piece to release said cam and commutator to permit closing of the chime circuits.

3. The combination, with a time piece mechanism having hour and minute hands, of a revolving commutator having contacting surfaces and brushes therefor, electric circuits for said brushes, mechanism for normally locking said commutator against premature movement, means actuated from the time-piece preceding the chime sounding period, for tripping said locking means and allowing a limited movement of the commutator, and means permitting said time piece operated means to return to its normal position at the beginning of the chime period and release said commutator.

4. The combination, with a time piece operating mechanism, of a commutator and means for revolving the same, a device for normally locking said commutator against revolution, a mechanical device operatively connected with and actuated by the said time piece for releasing said commutator locking means preceding the chime period, means for arresting the movement of said commutator operating means immediately following its release, said releasing device being mounted to return to its normal position when the chime period is reached for releasing said commutator, said locking mechanism checking the movement of said commutator at the end of the chime period.

5. In a chime clock, a revolving commutator having contacting surfaces and brushes therefor, electric circuits for said brushes, a chime mechanism in said electric circuits, mechanism for revolving the commutator, a cam formed with a shoulder and operatively connected with the operating mechanism of said commutator and having a dog for engaging said shoulder and to lock said commutator, a hook mounted to move simultaneously with said dog and enter notches provided at intervals in a part of the commutator, a time-piece and mechanism connecting with said dog and positioned in relation to a part of the time-piece to be actuated therefrom for tripping said dog to release said commutator.

6. The combination, with a commutator and means for revolving the same, said commutator having contacting surfaces and brushes therefor, electric circuits for said brushes, a cam formed with a shoulder and connected with the operating mechanism of said commutator, a dog normally engaging said shoulder, a time-piece, means connected with the dog and actuated from the time-piece tripping said dog preceding the chime periods, and mechanism for checking the movement of said commutator following the tripping of said dog until the chime period is reached.

7. The combination, with a time piece, of a revolving commutator having contacting surfaces and brushes therefor, electric circuits for said brushes, a chime mechanism connected with said circuits, means for normally locking said commutator, a positively operating mechanism actuated at predetermined intervals by a moving part of said time-piece and connected with the locking means for releasing said commutator, a striking attachment for said time piece and mechanism operated by the commutator at a predetermined point in its movement for releasing said striking attachment.

8. The combination, with a master clock, of a revolving commutator having contacting surfaces and brushes therefor, electric circuits for said brushes, chimes in said circuits, mechanism controlled by a part of the time piece and having connections with the commutator for releasing said commutator at predetermined intervals, a striking attachment for said clock, and mechanism actuated from the commutator for releasing said striking attachment at predetermined intervals.

9. The combination, with a master clock, of a chime attachment having electric circuits, a mechanically operated device controlled by said master clock for closing said circuits to operate the chimes at fifteen minute intervals, the mechanism for operating said device including means for releasing the mechanism prior to the end of a fifteen minute interval and then checking further operation of said mechanism until the end of the interval is reached.

10. The combination, with a master clock and chimes having electric circuits, of a mechanically operated device for closing said electric circuits to sound said chimes at predetermined intervals, means for positively controlling said mechanically operated device through the movement of said master clock, a striking attachment for said master clock, and mechanism rendered operative by the movement of said mechanically operated device for controlling said striking attachment.

11. The combination, with a master clock, of a revolving commutator having contacting surfaces and brushes therefor and electric circuits for said brushes, chimes in said circuits, said commutator being power-operated but normally stationary and having a mechanical locking device, and a member connected with said time piece and operated positively thereby at predetermined intervals for tripping said locking mechanism to release said commutator.

In witness whereof, we have hereunto set our hands this 3 day of May, 1916.

THOMAS C. ADAMS.
ARTHUR M. ROACH.